UNITED STATES PATENT OFFICE.

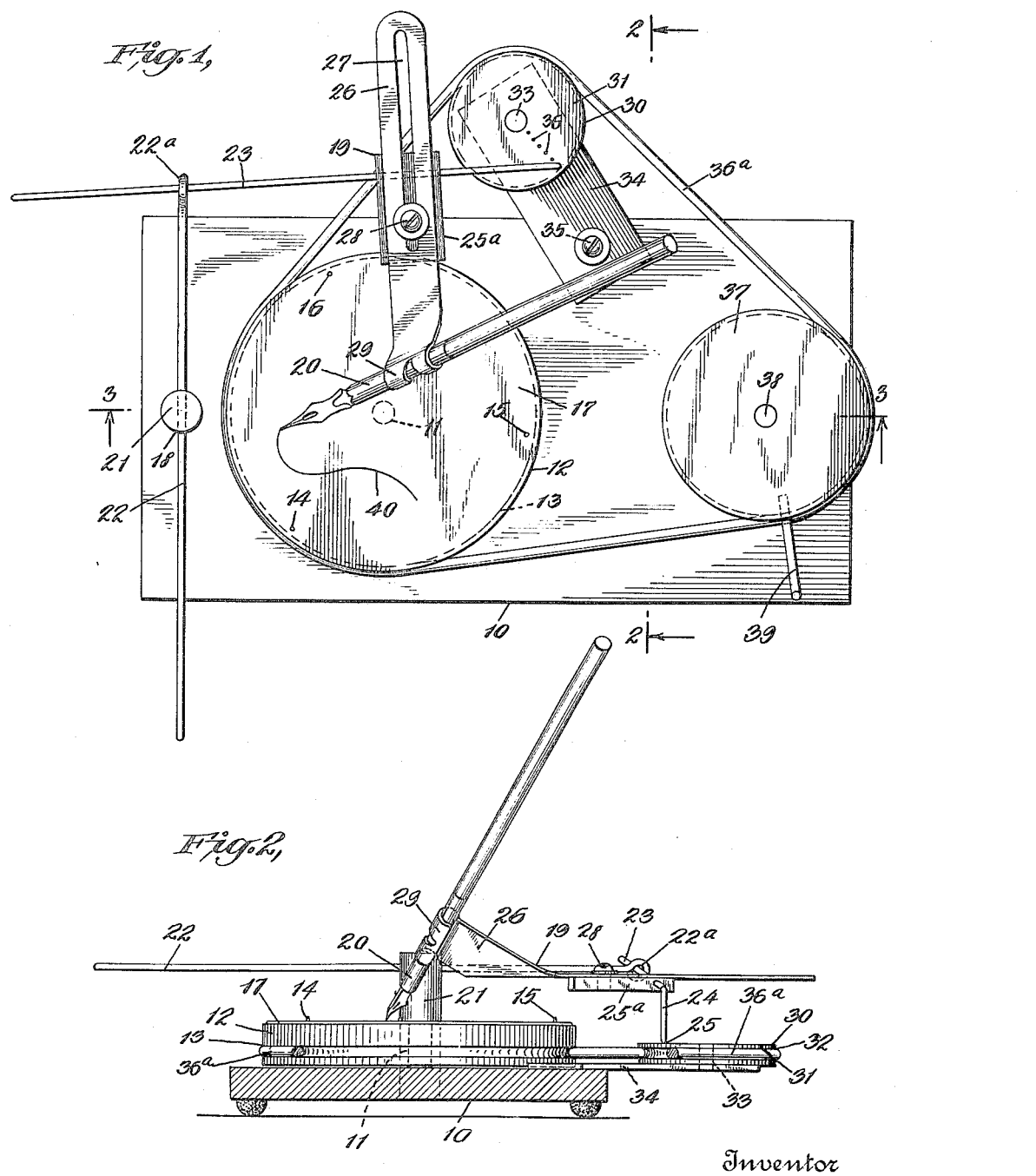

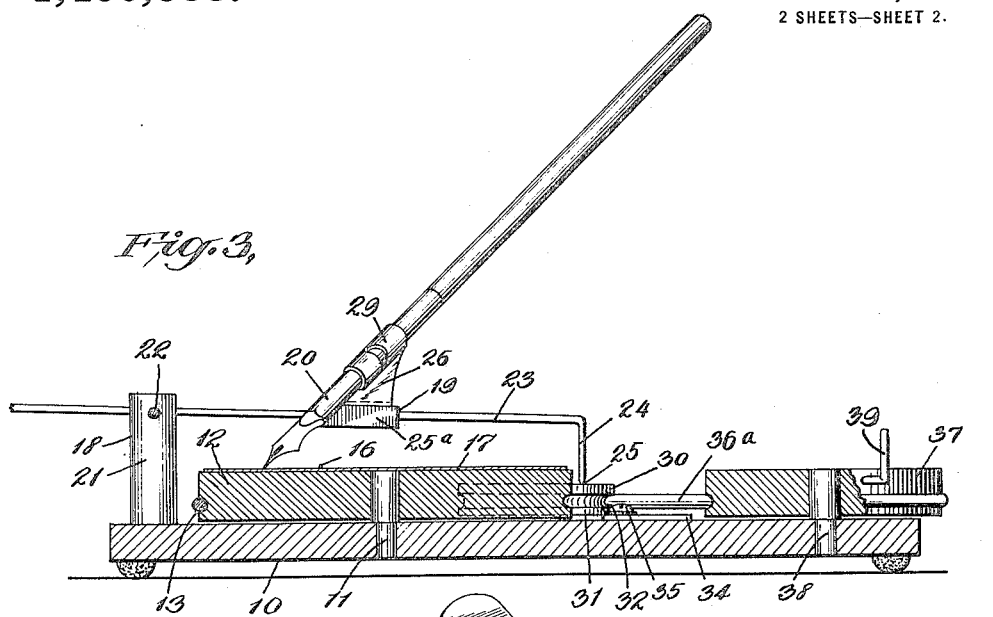
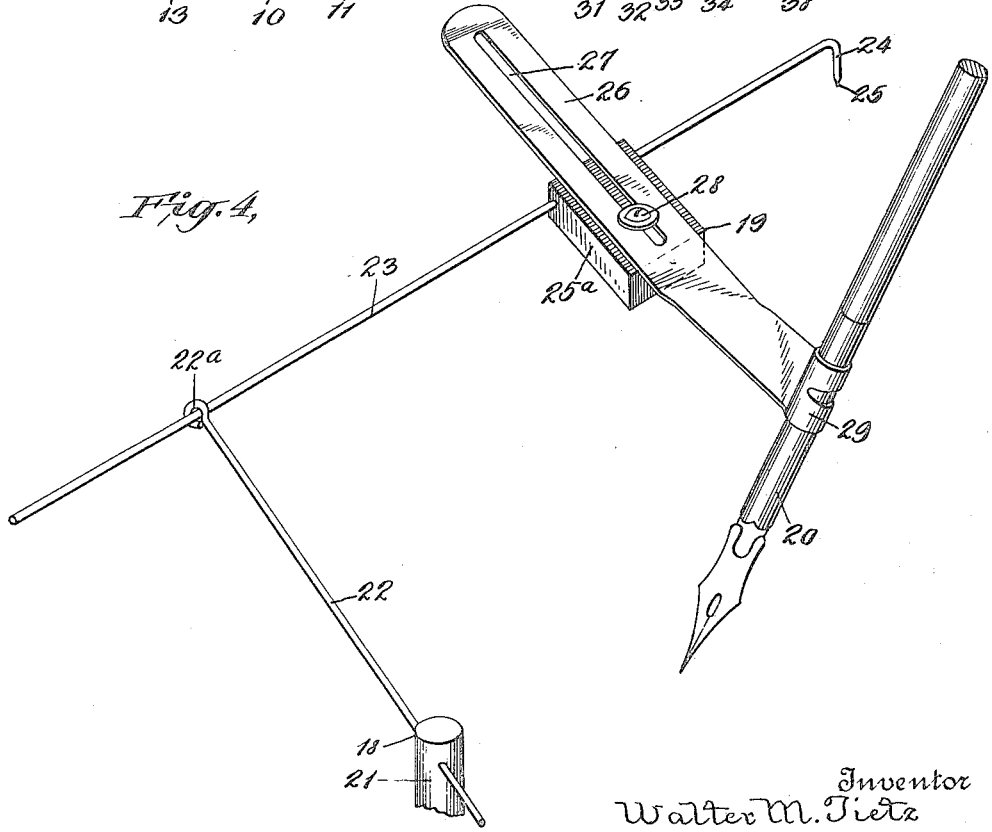

WALTER M. TIETZ, OF NEWARK, NEW JERSEY.

DEVICE FOR MAKING DESIGNS.

1,400,838.   Specification of Letters Patent.   Patented Dec. 20, 1921.

Application filed December 1, 1919. Serial No. 341,689.

*To all whom it may concern:*

Be it known that I, WALTER M. TIETZ, a citizen of the United States, and a resident of Newark, in the county of Essex and State of New Jersey, have invented a certain new and useful Improvement in a Device for Making Designs, of which the following is a full, clear, and exact specification.

This invention relates to a class of amusement devices.

My invention has for its object primarily to provide a toy adapted to be employed by persons, especially children, whereby fanciful designs may be produced on writing surfaces, such as paper, cardboard and the like, by the use of pen, pencil or other writing implement, and which is of a form designed to afford amusing and instructive occupation to the operator. The invention consists essentially of a base having a rotatable drawing board for removably holding a sheet of paper and like writing surface, and on the base is an adjustable bracket. A separate holder for removably carrying a writing implement is provided, and this holder is adapted to be detachably connected to the bracket so that the implement will be in engagement with the writing surface for inscribing thereon fanciful designs. On the base is an adjustable guide adapted to be adjustably engaged by the holder, and this guide is revoluble in unison with the rotation of the drawing board for moving the holder whereby its implement will inscribe designs on the writing surface.

Other objects of the invention are to provide manually operative means for rotating the drawing board and the guide synchronously; and to provide a toy which may be made of any suitable material in any desired size.

With these and other objects in view, the invention will be hereinafter more particularly described with reference to the accompanying drawings forming a part of this specification in which similar characters of reference indicate corresponding parts in all the views, and will then be pointed out in the claim at the end of the description.

In the drawings, Figure 1 is a top plan of one form of toy embodying my invention.

Fig. 2 is a detail sectional view taken on the line 2—2 of Fig. 1.

Fig. 3 is a detail sectional view taken on the line 3—3 of Fig. 1, and

Fig. 4 is an enlarged fragmentary view showing in perspective the adjustable bracket and the holder with a marking implement used in the device.

The device or toy has a base 10 which may be of any suitable size and shape, though the base is preferably in the form of a substantially rectangular plate, and revoluble on a pin or stud 11 projecting upwardly in proximity to one end of the base plate is a drawing board or carrier or supporting element 12. This rotatable drawing board is in the form of a circular disk having in its periphery a groove 13, and protruding upwardly at spaced intervals from the top face of the grooved board or disk may be a number of pins, as 14, 15, 16, to allow sheets of paper, cardboard or other kinds of desired writing surface elements, as 17, to be removably held on the board.

At the end of the base plate 10 adjacent to the carrier or drawing board 12 is a bracket 18 which may be of an adjustable type for operatively supporting a separate holder, as 19, adapted to removably carry a pencil, pen or other drawing or marking implement, as 20, for inscribing or producing on each of the surface elements 17 fanciful designs, as will be hereinafter more fully explained. The bracket 18 may be of any desired form, though the one illustrated consists of a fixed post, as 21, which is of a length so that it extends some distance above the board 12. In an opening in the free end part of the post 21 is a rod 22 arranged so that its ends extend to or beyond the side edges of the base plate 10. On one end of the rod 22 may be a loop or eye $22^a$, and the rod is slidably adjustable back and forth to suitably position the loop relative to the drawing board 12.

The holder 19 for carrying the marking implement 20 preferably consists of a rod, or bar 23 having one of its ends bent right-angularly, as 24, and the free end of this bent part may be pointed, as at 25. The angular rod 24 is of a length so that its other end may be removably as well as slidably disposed through the eye $22^a$ of the rod 22 of the bracket 18, while its bent end extends to the central part of one of the side edges of the base plate 10. The pointed end of the bent part of the rod 24 is disposed downwardly, and on this rod in spaced proximity to the bent part is held one end of an angular plate or block $25^a$ which is arranged so that its other end overhangs the base plate 10 when the rod is movably mounted in the eye 22ª of the rod 22 of the bracket. On the block 25ª is a strip, as 26, having a lengthwise slot 27 through which is passed a bolt or screw 28 provided on the block for fastening the strip so that it may be adjustably moved crosswise as well as circumferentially on the block, and on one end of this adjustable strip is a clip which is preferably in the form of a spring metal partially ring-like band, as 29, adapted to removably carry the writing or marking implement 20.

In order to operate the holder 19 and the implement 20 for inscribing designs on the writing surface 17, an adjustable guide, as 30, is provided. The guide 30, is composed of a circular wheel or disk 31 having in its peripheral edge a groove 32. This grooved wheel is pivoted, at 33, to a block or board 34 which is also pivoted, at 35, to the central part of one of the lengthwise edges of the base plate 10 in spaced relation to the drawing board 12, and in the top face of the grooved wheel 31 are a number of spaced holes or sockets 36 for receiving the pointed end 25 of the bent part 24 of the bar 23 of the holder 19.

Over the grooved revoluble board 12 as well as over the grooved wheel or guide 32 is arranged a belt 36ª which also passes around a peripherally grooved wheel 37 pivoted, at 38, on the base plate 10 at its end opposite to the rotatable board 12, and protruding from this grooved wheel or guide 32 is a handle or crank 39 for manually turning the guide.

The toy is operated by placing on the pins 14, 15, 16 of the carrier or board 12 a sheet of paper, cardboard or the like to serve as the inscribing surface element 17. In the spring clip 29 of the holder 19 is mounted the implement 20 which is arranged so that when the bar 23 is disposed in the eye 22ª of the adjustable rod 22 of the bracket 18 the writing point of the implement will contact with the surface element 17 and so that the pointed end 25 of the bar 23 may be arranged in one of the sockets 36 of the wheel or guide 32. By turning the crank handle 39 such as from left to right, the grooved wheel 37, guide 32 and board 12 will be driven in unison by the driving of the belt 36ª, and the rotation of the guide wheel 32 will cause the bent end part 24 of the bar 23 together with the other parts of the holder 19 to be swung circumferentially. The implement 20 will then be likewise moved on the surface element 17 for inscribing on the element a fanciful design, as 40. By adjusting the guide 32 to different positions on the base plate 10 as well as by shifting the pointed end 25 of the bar 23 in the sockets 36 of the guide, the implement 20 will be accordingly changed in position to move in different radii so that various designs will be produced on the surface element 17, and thus the device or toy may be employed to afford much amusing and instructive occupation to persons, especially children.

In the foregoing description, I have embodied the preferred form of my invention, but I do not wish to be understood as limiting myself thereto as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

In a device for marking designs having a circular disk adapted to be manually revolved for rotatably carrying a writing surface element, a fixed apertured post adjacent to the disk, a bar slidably adjustable in the aperture of the post tangentially with relation to the disk and said bar having on one of its ends an eye, a rod slidably movable in the eye of the bar and pivotally connected to the disk, and a strip having on one of its ends a partial band for removably holding a marking implement in movable contact with the writing surface element and the strip being adjustably mounted on the slidably movable rod to move to various positions relative to the center of the disk as well as to move with the slidable rod for causing the marking implement to move in different directions on the writing surface when the disk is revolved.

This specification signed and witnessed this 29th day of November A. D. 1919.

WALTER M. TIETZ.

Witnesses:
JOSEPH BAILY,
J. FREDERICK CRYER.